US012536200B2

(12) United States Patent
Monga et al.

(10) Patent No.: US 12,536,200 B2
(45) Date of Patent: Jan. 27, 2026

(54) SYSTEM FOR OPTIMIZED TRANSMISSION LOG STORAGE AND RETRIEVAL

(71) Applicant: JPMorgan Chase Bank, N.A., New York, NY (US)

(72) Inventors: Varun Monga, Bengaluru (IN); Kiran Sekharamahanthi, Newark, DE (US); Daniel Wilson, Bangalore (IN)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 18/678,760

(22) Filed: May 30, 2024

(65) Prior Publication Data

US 2025/0321982 A1 Oct. 16, 2025

(30) Foreign Application Priority Data

Apr. 16, 2024 (IN) .............................. 202411030539

(51) Int. Cl.
*G06F 16/28* (2019.01)
*G06F 16/22* (2019.01)
*G06F 16/27* (2019.01)

(52) U.S. Cl.
CPC ........ *G06F 16/285* (2019.01); *G06F 16/2282* (2019.01); *G06F 16/278* (2019.01)

(58) Field of Classification Search
CPC ........................... G06F 16/285; G06F 16/2282
USPC ........................................................ 707/737
See application file for complete search history.

(56) References Cited

U.S. PATENT DOCUMENTS

| | | | |
|---|---|---|---|
| 10,853,182 B1 * | 12/2020 | Vig .......................... | G06F 16/23 |
| 2019/0065337 A1 * | 2/2019 | Tanabe ................ | G06F 11/3433 |
| 2021/0027503 A1 * | 1/2021 | Kumaresan ......... | G06F 3/04842 |
| 2023/0297592 A1 * | 9/2023 | Palukuri .............. | G06F 16/278 |
| 2023/0325388 A1 * | 10/2023 | Anand ................ | G06F 16/2282 |
| | | | 707/722 |

* cited by examiner

*Primary Examiner* — Muluemebet Gurmu
(74) *Attorney, Agent, or Firm* — Greenblum & Bernstein, P.L.C.

(57) ABSTRACT

A system for implementing a transmission log bucketing tool that provides an optimized transmission log storage and retrieval scheme. The system may comprise a processor and memory storing instructions that cause the processor to perform operations. The operations may comprise generating a manifest that comprises a transmission log table, obtaining a first set of transmission logs, evaluating the first set of transmission logs against the manifest to determine a first set of respectively corresponding shard keys, and utilizing the first set of respectively corresponding shard keys to at least one from among store the first set of transmission logs and retrieve the first set of transmission logs.

20 Claims, 5 Drawing Sheets

SYSTEM FOR OPTIMIZED TRANSMISSION LOG STORAGE AND RETRIEVAL

CROSS-REFERENCE TO RELATED APPLICATIONS

This application claims priority benefit from Indian Application No. 202411030539, filed Apr. 16, 2024, which is hereby incorporated by reference in its entirety.

BACKGROUND

1. Field of the Invention

The field of the invention disclosed herein generally relates to transmission log storage and retrieval and, more particularly, to a method, system, and computer-readable medium for implementing technology that provides a transmission log storage and retrieval scheme that optimizes transmission log storage device performance and, thereby, improves transmission log storage device user-experience.

2. Background of the Invention

The operational efficiency of distributed database systems is intricately tied to the size of their partitions. For example, larger partitions have more latency because they require more processing. In addition, conventional partitioning techniques typically lead current distributed database management systems to deploy suboptimal partitions, which can lead to read query surges and high response times. However, there is currently no technology available to optimize the size of partitions deployed by distributed database management systems.

Therefore, conventional distributed database management systems are subject to unnecessarily poor performance that can lead to undesirable user-experiences because large partitions place a lot of pressure on their Java heap and garbage collector and have the potential to raise issues such as load shedding and dropped messages to crashed and downed nodes.

Accordingly, there is a need in the field of the herein-disclosed invention for a technical solution to the foregoing absence of technology for the management of distributed database systems.

SUMMARY

The present disclosure, through one or more of its various aspects, embodiments, and/or specific features or sub-component, provides, inter alia, various systems, servers, devices, methods, media, programs and platforms for implementing a transmission log bucketing tool that provides a transmission log storage and retrieval scheme that optimizes transmission log storage device performance and, thereby, improves transmission log storage device user-experience.

According to an aspect of the present disclosure, a method is provided for implementing a transmission log bucketing tool that provides an optimized transmission log storage and retrieval scheme. The method may comprise formatting at least one transmission log storage partition of at least one transmission log storage device, generating a manifest that comprises a transmission log table, obtaining a first set of transmission logs, evaluating the first set of transmission logs against the manifest to determine a first set of respectively corresponding shard keys, and utilizing the first set of respectively corresponding shard keys to at least one from among store the first set of transmission logs and retrieve the first set of transmission logs.

In the method, the transmission log table may comprise a row for each transmission log that is recorded and a set of columns that, for each row, includes a transmission log identification column, a transmission log timestamp column, and a shard key column that identifies at least one from among a corresponding transmission log storage partition and a corresponding transmission log storage device.

In the method, the first set of transmission logs may include a first transmission log that comprises a first transmission log identification, a first transmission log timestamp, and a first description of a first content of the first transmission log.

In the method, the evaluating may comprise: determining that the transmission log table includes a first set of rows that collectively comprise a first set of respectively corresponding transmission log identification columns that collectively identify the first set of transmission logs; and determining the first set of respectively corresponding shard keys by identifying a first set of respectively corresponding shard key columns that collectively identify the first set of respectively corresponding shard keys. The first set of rows may further comprise the first set of respectively corresponding shard key columns.

In the method, the utilizing may comprise respectively retrieving the first set of transmission logs from a first set of respectively corresponding storage partitions that are identified by the first set of respectively corresponding shard keys.

In the method, the utilizing may comprise respectively storing the first set of transmission logs within a first set of respectively corresponding storage partitions that are respectively identified by the first set of respectively corresponding shard keys.

In the method, the evaluating may comprise: determining that the transmission log table does not include a first set of rows that collectively comprise a first set of respectively corresponding transmission log identification columns that collectively identify the first set of transmission logs; generating the first set of respectively corresponding shard keys; and updating the transmission log table to include the first set of rows. The first set of rows may further comprise a first set of respectively corresponding shard key columns that collectively identify the first set of respectively corresponding shard keys.

In the method, the generating may comprise: determining a first transmissions account from the first set of transmission logs; determining that at least a first transmission log storage partition of at least a first transmission log storage device is currently assigned to the first transmissions account; deriving at least a first shard key from an identification of the at least the first transmission log storage partition of the at least the first transmission log storage device; and populating, with the at least the first shard key, at least a first shard key column from among the first set of respectively corresponding shard key columns. The first set of transmission logs may comprise at least a first transmission log that identifies the first transmissions account.

In the method, the first transmissions account may be assigned to the first transmission log storage partition and the first transmission log storage partition may comprise a first available transmission log storage partition that has been cued up to record a next new transmission log.

The method may further comprise utilizing a plurality of sets of shard keys to store a plurality of sets of transmission logs within a plurality of respectively corresponding transmission log storage partitions. Each transmission log storage partition may be configured to store no more than a respectively corresponding threshold amount of transmission logs, and the respectively corresponding threshold amount may be an amount of transmission logs above which a reduction in a speed of operation is realized by a respectively corresponding transmission log storage device of each respectively corresponding transmission log storage partition.

A system for implementing a transmission log bucketing tool that provides an optimized transmission log storage and retrieval scheme, the system comprising: a processor; and memory storing instructions that, when executed by the processor, cause the processor to perform operations comprising: formatting at least one transmission log storage partition of at least one transmission log storage device, generating a manifest that comprises a transmission log table, obtaining a first set of transmission logs, evaluating the first set of transmission logs against the manifest to determine a first set of respectively corresponding shard keys, and utilizing the first set of respectively corresponding shard keys to at least one from among store the first set of transmission logs and retrieve the first set of transmission logs.

In the system, when the instructions are executed, the transmission log table may comprise a row for each transmission log that is recorded and a set of columns that, for each row, includes: a transmission log identification column, a transmission log timestamp column, and a shard key column that identifies at least one from among a corresponding transmission log storage partition and a corresponding transmission log storage device.

In the system, when the instructions are executed, the first set of transmission logs may include a first transmission log that comprises a first transmission log identification, a first transmission log timestamp, and a first description of a first content of the first transmission log.

In the system, when the instructions are executed, the evaluating may comprise: determining that the transmission log table includes a first set of rows that collectively comprise a first set of respectively corresponding transmission log identification columns that collectively identify the first set of transmission logs, and determining the first set of respectively corresponding shard keys by identifying a first set of respectively corresponding shard key columns that collectively identify the first set of respectively corresponding shard keys. The first set of rows further comprise the first set of respectively corresponding shard key columns.

In the system, when the instructions are executed, the utilizing may comprise respectively retrieving the first set of transmission logs from a first set of respectively corresponding storage partitions that are identified by the first set of respectively corresponding shard keys.

In the system, when the instructions are executed, the utilizing may comprise respectively storing the first set of transmission logs within a first set of respectively corresponding storage partitions that are respectively identified by the first set of respectively corresponding shard keys.

In the system, when the instructions are executed, the evaluating may comprise: determining that the transmission log table does not include a first set of rows that collectively comprise a first set of respectively corresponding transmission log identification columns that collectively identify the first set of transmission logs; generating the first set of respectively corresponding shard keys; and updating the transmission log table to include the first set of rows. The first set of rows may further comprise a first set of respectively corresponding shard key columns that collectively identify the first set of respectively corresponding shard keys.

In the system, when the instructions are executed, the generating may comprise: determining a first transmissions account from the first set of transmission logs; determining that at least a first transmission log storage partition of at least a first transmission log storage device is currently assigned to the first transmissions account; deriving at least a first shard key from an identification of the at least the first transmission log storage partition of the at least the first transmission log storage device; and populating, with the at least the first shard key, at least a first shard key column from among the first set of respectively corresponding shard key columns. The first set of transmission logs may comprise at least a first transmission log that identifies the first transmissions account.

In the system, when the instructions are executed, the first transmissions account may be assigned to the first transmission log storage partition and the first transmission log storage partition may comprise a first available transmission log storage partition that has been cued up to record a next new transmission log.

In the system, when executed, the instructions may cause the processor to perform further operations. The further operations may comprise utilizing a plurality of sets of shard keys to store a plurality of sets of transmission logs within a plurality of respectively corresponding transmission log storage partitions. Each transmission log storage partition may be configured to store no more than a respectively corresponding threshold amount of transmission logs, and the respectively corresponding threshold amount may be an amount of transmission logs above which a reduction in a speed of operation is realized by a respectively corresponding transmission log storage device of each respectively corresponding transmission log storage partition.

According to yet another aspect of the present disclosure, a non-transitory computer-readable medium is provided for implementing a transmission log bucketing tool that provides an optimized transmission log storage and retrieval scheme. The computer-readable medium may comprise instructions that, when executed by a processor, cause the processor to perform operations. The operations may comprise formatting at least one transmission log storage partition of at least one transmission log storage device, generating a manifest that comprises a transmission log table, obtaining a first set of transmission logs, evaluating the first set of transmission logs against the manifest to determine a first set of respectively corresponding shard keys, and utilizing the first set of respectively corresponding shard keys to at least one from among store the first set of transmission logs and retrieve the first set of transmission logs.

In the computer-readable medium, when the instructions are executed, the transmission log table may comprise a row for each transmission log that is recorded and a set of columns that, for each row, includes: a transmission log identification column, a transmission log timestamp column, and a shard key column that identifies at least one from among a corresponding transmission log storage partition and a corresponding transmission log storage device.

In the computer-readable medium, when the instructions are executed, the first set of transmission logs may include a first transmission log that comprises a first transmission log identification, a first transmission log timestamp, and a first description of a first content of the first transmission log.

In the computer-readable medium, when the instructions are executed, the evaluating may comprise: determining that the transmission log table includes a first set of rows that collectively comprise a first set of respectively corresponding transmission log identification columns that collectively identify the first set of transmission logs; and determining the first set of respectively corresponding shard keys by identifying a first set of respectively corresponding shard key columns that collectively identify the first set of respectively corresponding shard keys. The first set of rows may further comprise the first set of respectively corresponding shard key columns.

In the computer-readable medium, when the instructions are executed, the utilizing may comprise respectively retrieving the first set of transmission logs from a first set of respectively corresponding storage partitions that are identified by the first set of respectively corresponding shard keys.

In the computer-readable medium, wherein when the instructions are executed, the utilizing may comprise respectively storing the first set of transmission logs within a first set of respectively corresponding storage partitions that are respectively identified by the first set of respectively corresponding shard keys.

In the computer-readable medium, when the instructions are executed, the evaluating may comprise: determining that the transmission log table does not include a first set of rows that collectively comprise a first set of respectively corresponding transmission log identification columns that collectively identify the first set of transmission logs; generating the first set of respectively corresponding shard keys; and updating the transmission log table to include the first set of rows. The first set of rows may further comprise a first set of respectively corresponding shard key columns that collectively identify the first set of respectively corresponding shard keys.

In the computer-readable medium, when the instructions are executed, the generating may comprise: determining a first transmissions account from the first set of transmission logs; determining that at least a first transmission log storage partition of at least a first transmission log storage device is currently assigned to the first transmissions account; deriving at least a first shard key from an identification of the at least the first transmission log storage partition of the at least the first transmission log storage device; and populating, with the at least the first shard key, at least a first shard key column from among the first set of respectively corresponding shard key columns. The first set of transmission logs may comprise at least a first transmission log that identifies the first transmissions account.

In the computer-readable medium, when the instructions are executed, the first transmissions account may be assigned to the first transmission log storage partition, and the first transmission log storage partition may comprise a first available transmission log storage partition that has been cued up to record a next new transmission log.

In the computer-readable medium, the instructions cause the processor to perform further operations when executed. The further operations may comprise utilizing a plurality of sets of shard keys to store a plurality of sets of transmission logs within a plurality of respectively corresponding transmission log storage partitions. Each transmission log storage partition may be configured to store no more than a respectively corresponding threshold amount of transmission logs, and the respectively corresponding threshold amount may be an amount of transmission logs above which a reduction in a speed of operation is realized by a respectively corresponding transmission log storage device of each respectively corresponding transmission log storage partition.

Accordingly, the invention disclosed herein provides a new approach to a transmission log storage and retrieval scheme that optimizes transmission log storage device performance and, thereby, improves transmission log storage device user-experience.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable storage media having instructions stored thereon for one or more aspects of the present technology as described and illustrated by way of the examples herein. In some examples, the instructions include executable code that, when executed by one or more processors, cause the processors to carry out steps necessary to implement the methods of the examples of this technology that are described and illustrated herein.

Figure 1:
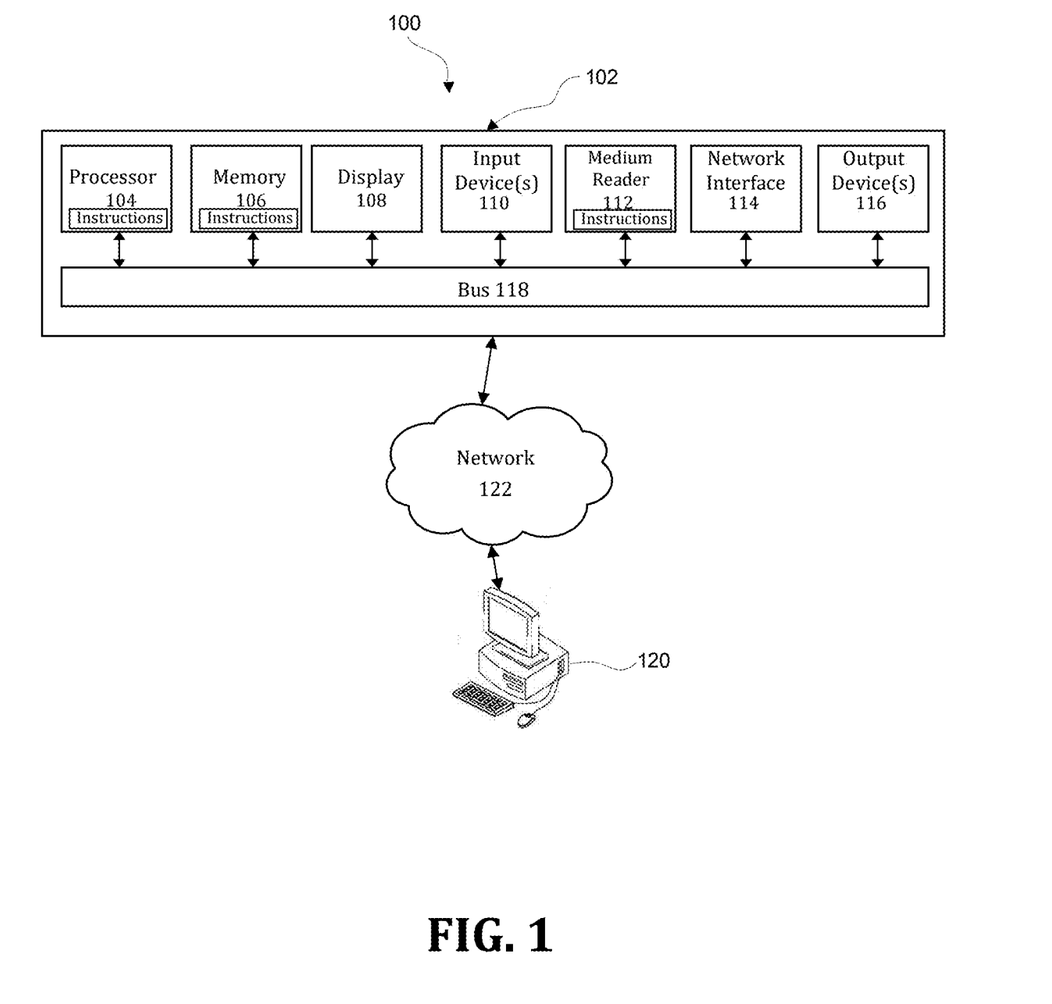
FIG. 1 depicts a diagram of an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for longer than a transitory period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data as well as executable instructions and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As illustrated in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is illustrated in FIG. 1 as a wireless network, those skilled in the art appreciate that the network 122 may also be a wired network.

The additional computer device 120 is illustrated in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide methods and systems for implementing a transmission log bucketing tool that provides a transmission log storage and retrieval scheme that optimizes transmission log storage device performance and, thereby, improves transmission log storage device user-experience.

Figure 2:
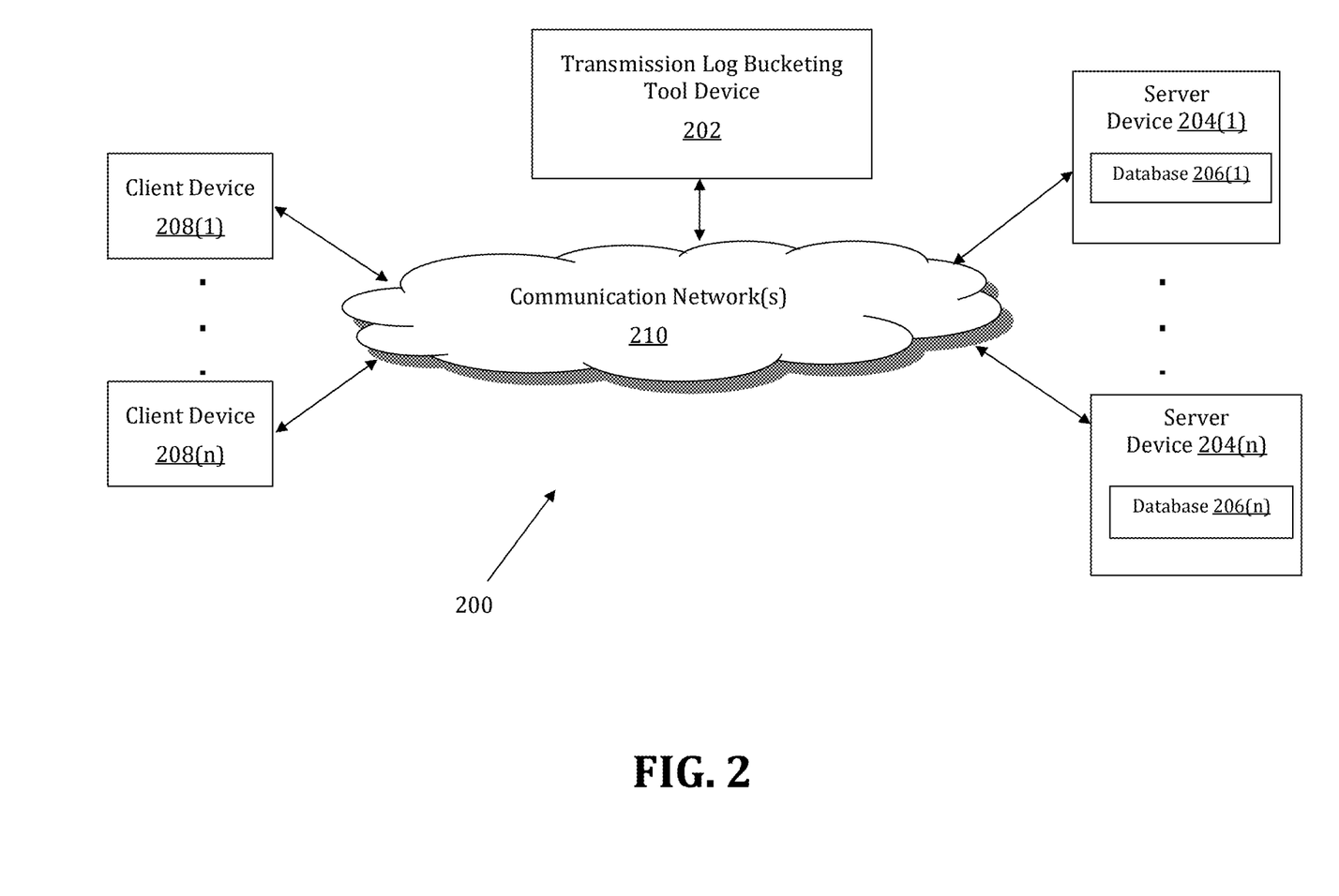
FIG. 2 depicts a diagram of an exemplary network environment for optimizing transmission log storage and retrieval.

Referring to FIG. 2, a schematic of an exemplary network environment 200 for optimizing transmission log storage and retrieval. In an exemplary embodiment, a transmission log bucketing tool may be implemented on any networked computer platform, such as, for example, a personal computer (PC).

A method for implementing a tool that provides an optimized transmission log storage and retrieval scheme, may be implemented by a transmission log bucketing tool (TLBT) device 202. The TLBT device 202 may be the same or similar to the computer system 102 as described with respect to FIG. 1. The TLBT device 202 may be a rack-mounted server in a datacenter, an embedded microcontroller (MCU) in an electronic device, or another type of headless system, which is a computer system or device that is configured to operate without a monitor, keyboard and mouse. The TLBT device 202 may store one or more applications that can include executable instructions that, when executed by the TLBT device 202, cause the TLBT device 202 to perform actions, such as to transmit, receive, or otherwise process network communications, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the TLBT device 202 itself, may be located in virtual server(s) running in a cloud-based computing environment rather than being tied to one or more specific physical network computing devices. Also, the application(s) may be running in one or more virtual machines (VMs) executing on the TLBT device 202. Additionally, in one or more embodiments of this technology, virtual machine(s) running on the TLBT device 202 may be managed or supervised by a hypervisor.

In the network environment 200 of FIG. 2, the TLBT device 202 is coupled to a plurality of server devices 204(1)-204(n) that hosts a plurality of databases 206(1)-206(n), and also to a plurality of client devices 208(1)-208(n) via communication network(s) 210. A communication interface of the TLBT device 202, such as the network interface 114 of the computer system 102 of FIG. 1, operatively couples and communicates between the TLBT device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the TLBT device 202, the server devices 204(1)-204 (n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, computer readable media, and TLBT devices that implement a method for a transmission log bucketing tool that provides a transmission log storage and retrieval scheme that optimizes transmission log storage device performance.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The TLBT device 202 may be a standalone device or integrated with one or more other devices or apparatuses, such as one or more of the server devices 204(1)-204(n), for example. In one particular example, the TLBT device 202 may include or be hosted by one of the server devices 204(1)-204(n), and other arrangements are also possible. As another example, the TLBT device 202 may be integrated with one or more other devices or apparatuses, such as one or more of the client devices 208(1)-208(n). Moreover, one or more of the devices of the TLBT device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, memories and communication interfaces, which are coupled together by at least one bus or other communication link, although other numbers and/or types of network devices may be used. The server devices 204(1)-204(n) in this example may process requests received from the TLBT device 202 via the communication network(s) 210 according to an HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store data that relates to a variety of databases.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the TLBT device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the TLBT device 202 via the communication network(s) 210 in order to communicate user requests and other information. The client devices 208(1)-208(n) may further include, among other features, a display device, such as a display screen or touchscreen, and/or an input device, such as a keyboard, for example.

Although the exemplary network environment 200 with the TLBT device 202, the server devices 204(1)-204(n), the databases 206(1)-206(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the TLBT device 202, the server devices 204(1)-204(n), the databases 206(1)-206(n), or the client devices 208(1)-208(n), for example, may be configured to operate as virtual instances on the same physical machine. In other words, one or more of the TLBT device 202, the server devices 204(1)-204(n), the databases 206(1)-206(n), or the client devices 208(1)-208(n) may operate on the same physical device rather than as separate devices communicating through communication network(s) 210. Additionally, there may be more or fewer server devices 204(1)-204(n), databases 206(1)-206(n), or client devices 208(1)-208(n) than illustrated in FIG. 2.

In addition, two or more computing systems, databases or devices may be substituted for any one of the systems, databases or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
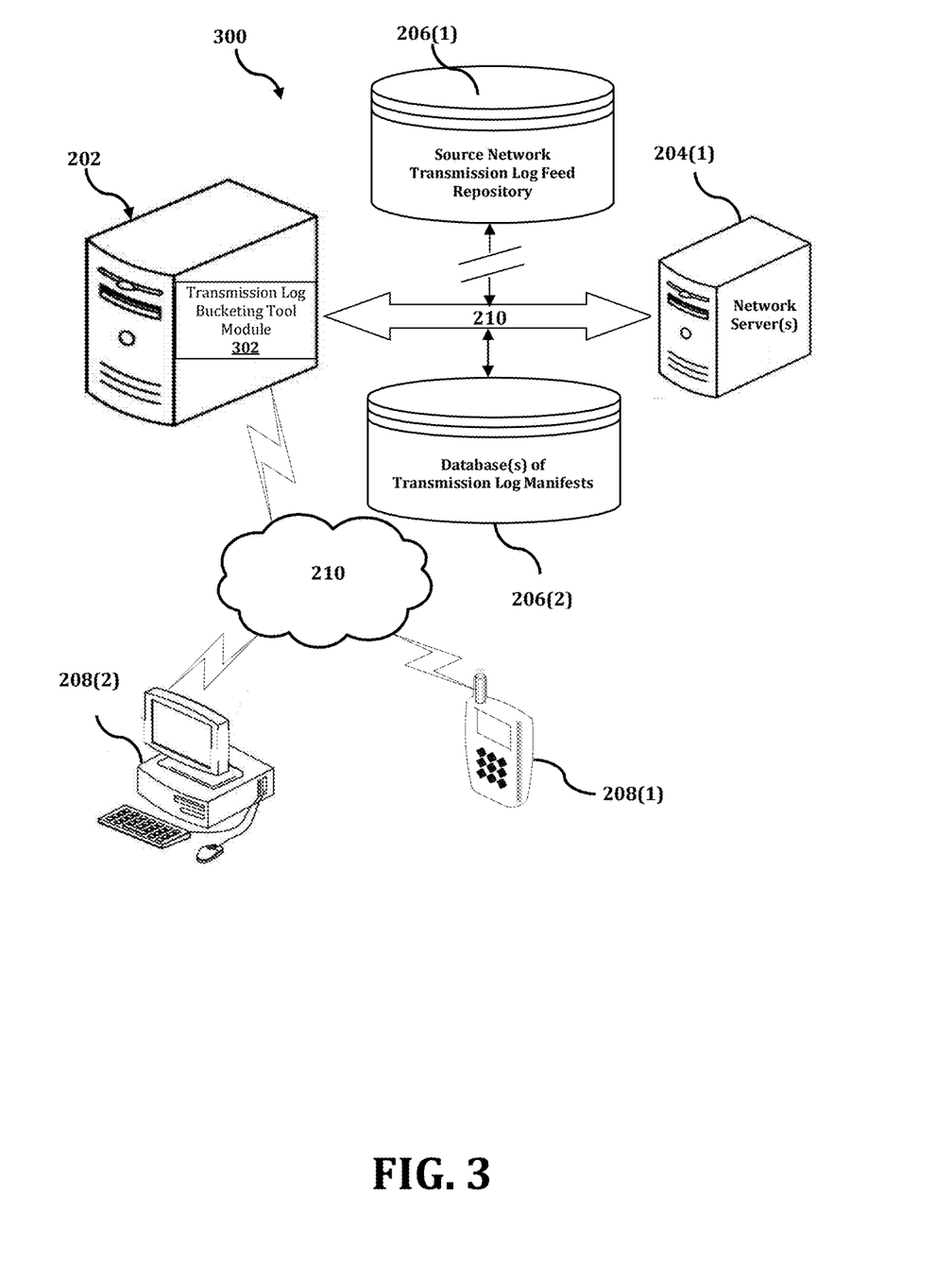
FIG. 3 depicts a diagram of an exemplary perspective of a network environment that optimizes transmission log storage and retrieval.

The TLBT device 202 is described and illustrated in FIG. 3 as including transmission log bucketing tool module 302, although it may include other rules, policies, modules, databases, or applications, for example. As will be described below, transmission log bucketing tool module 302 is configured to provide a transmission log storage and retrieval scheme that optimizes transmission log storage device performance and, thereby, improves transmission log storage device user-experience. Transmission log bucketing tool module 302 may include software that is based on a microservices architecture.

Transmission log bucketing tool module 302 may be integrated with one or more devices or apparatuses, such as client devices 208(1)-208(n), where transmission log bucketing tool module 302 may be implemented as an application or as an addon or plugin to another application of the one or more devices or apparatuses, and where transmission log bucketing tool module 302 may execute in the background.

An exemplary process 300 for application of a transmission log bucketing tool to an aspect of the network environment of FIG. 2 is illustrated as being executed in FIG. 3. Specifically, a first client device 208(1) and a second client device 208(2) are illustrated as being in communication with TLBT device 202. In this regard, the first client device 208(1) and the second client device 208(2) may be "clients" of the TLBT device 202 and are described herein as such. Nevertheless, it is to be known and understood that the first client device 208(1) and/or the second client device 208(2) need not necessarily be "clients" of the TLBT device 202, or any entity described in association therewith herein. Any additional or alternative relationship may exist between either or both of first client device 208(1), second client device 208(2) and TLBT device 202, or no relationship may exist.

Further, TLBT device 202 is illustrated as being able to access Source Network Transmission Log Feed Repository 206(1), and Database(s) of Transmission Log Manifests 206(2). TLBT device 202 may comprise transmission log bucketing tool module 302, which communicates with Source Network Transmission Log Feed Repository 206(1). In addition, transmission log bucketing tool module 302 of TLBT device 202 may also communicate with Database(s) of Transmission Log Manifests 206(2). Transmission log bucketing tool module 302 may be configured to provide a dynamically customizable interface for storing and retrieving transmission logs from one or more transmission log storage devices.

Moreover, TLBT device 202 may receive and transmit data via communication network(s) 210. TLBT device 202 may receive and transmit data such as code that is written in one or more of the following dialects: transaction control language (TCL), data manipulation language (DML), data control language (DCL) and data definition language (DFL).

Additionally, via communication network(s) 210, TLBT device 202 may respectively receive and transmit data from and to one or more from among the following devices: server device 204, Source Network Transmission Log Feed Repository 206(1), Database(s) of Transmission Log Manifests 206(2) (or another database 206), first client device 208(1), the second client device 208(2), and communication network(s) 210, for example.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The client devices 208(1)-208(n) may represent, for example, computer systems of an organization's client network. The first client device 208(1) may represent, for example, one or more computer systems of a client or of a cluster of clients within the organization or client network. Of course, the first client device 208(1) may include one or more of any of the devices described herein. The second client device 208(2) may be, for example, one or more computer systems of another client or cluster of clients within the organization or client network. Of course, the second client device 208(2) may include one or more of any of the devices described herein.

The process may be executed via the communication network(s) 210, which may comprise plural networks as described above. For example, in an exemplary embodiment, either or both of the first client device 208(1) and the second client device 208(2) may communicate with the TLBT device 202 via broadband or cellular communication. Of course, these embodiments are merely exemplary and are not limiting or exhaustive.

Transmission log bucketing tool module 302 provides a programmatic approach to transmission log storage and retrieval that optimizes transmission log storage device performance and, thereby, improves transmission log storage device user-experience.

Transmission log bucketing tool module 302 may execute a process that provides a transmission log storage and retrieval scheme that optimizes transmission log storage device performance and, thereby, improves transmission log storage device user-experience. An exemplary process for a transmission log bucketing tool is generally indicated at flowchart 400 in FIG. 4.

Figure 4:
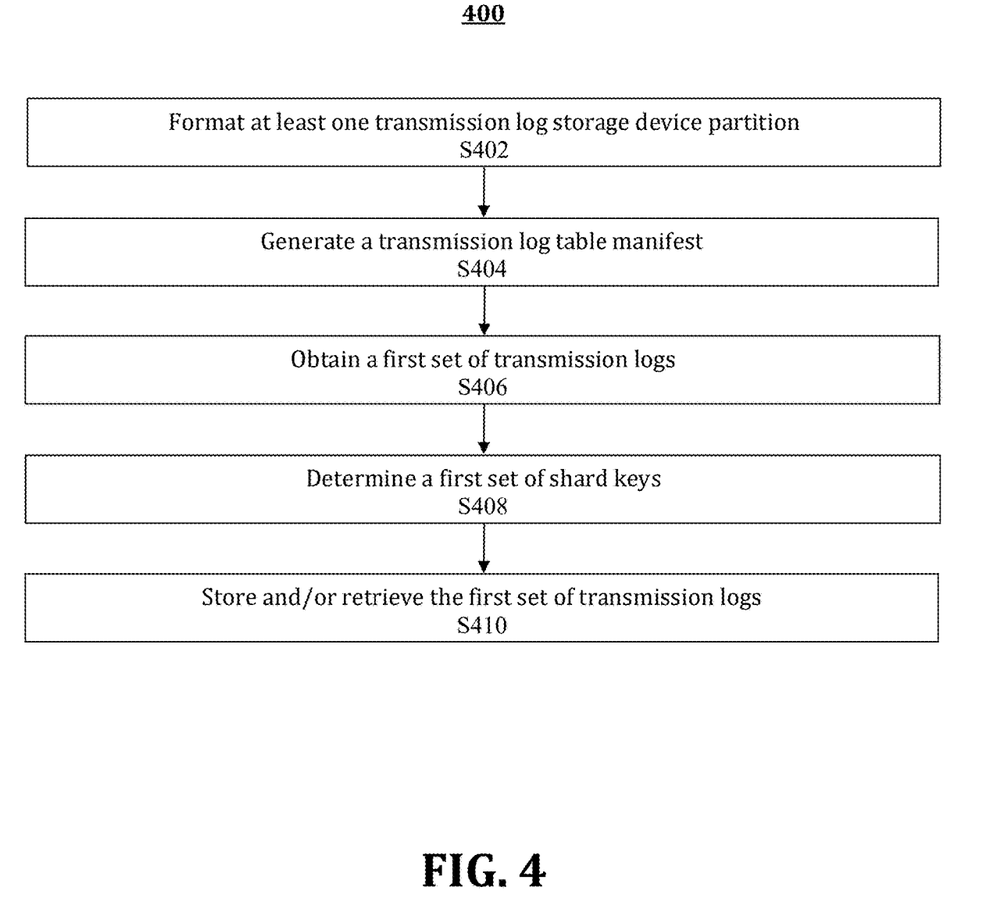
FIG. 4 depicts a flowchart of an exemplary process for optimizing transmission log storage and retrieval.

In process 400 of FIG. 4, at step S402, transmission log bucketing tool module 302 formats at least one transmission log storage partition of at least one transmission log storage device within a distributed database system. In an embodiment, at step S402, the formatting may be triggered by selecting an optimal amount of the at least one storage device's memory to format as the at least one transmission log storage partition. In a further embodiment, transmission log bucketing tool module 302 may select the optimal amount of the at least one storage device. As presented herein, this optimal amount may refer to the amount of memory above which a speed of a corresponding transmission log storage device begins to fall below a predetermined standard (e.g., 80% of a transmission storage device's maximum speed).

At step S404, transmission log bucketing tool module 302 generates at least one manifest that stores at least one transmission log table. In an embodiment, the at least one transmission log table may comprises a row for each transmission log that is recorded and a set of columns that, for each row, includes: (i) a transmission log identification column; (ii) a transmission log timestamp column; and (iii) a shard key column that identifies at least one from among a corresponding transmission log storage partition and a corresponding transmission log storage device.

It should be noted that the term "shard", as presented herein, refers to a subsection of a storage device's memory, such as the memory of a transmission log storage device that is located within a distributed database system. Accordingly, exemplary embodiments of the framework presented herein may designate a set of subsections (or "shards") of a distributed database system's memory, to collectively store any given transmissions account's transmission logs (as opposed to assigning a single section or "partition" of memory to fulfill such purpose) and, as presented herein, the phrase "shard key" may refer to an actual value of a particular subsection's or shard's index within the given transmission account's manifest or corresponding transmission log table.

In an embodiment, the index of each particular subsection (or "shard") may identify a storage location of that shard and, in a further embodiment, that storage location may identify: a corresponding transmission log storage partition, a corresponding transmission log storage device, or both. For the purposes of the herein-presented discussion, in such embodiments, the values provided by the indexes of these shards may be referred to as "shard keys," and the indexes may be arranged in either an ascending or descending order, such as ordering each log according to an ascending (or descending) numeric (or alphabetical) order of transmission log identifications.

However, the ordering of each transmission log may additionally (or alternatively) have more than one basis. For example, the transmission log index may additionally (or alternatively) be arranged according to an ascending (or descending) transmission timestamp value and, in some embodiments, transmissions having a same timestamp value may then be arranged according to an ascending (or descending) order of their respectively corresponding transmission log identifications.

At step S406, transmission log bucketing tool module 302 obtains a first set of transmission logs from at least one source transmission network that sends actual transmissions to and from a plurality of the at least one source transmission network's end users who each have their own transmissions account. As presented herein, transmission logs refer to records that comprise details of the at least one source transmission network's transmissions. In an embodiment, the first set of transmission logs may include a first transmission log that comprises a first transmission log identification, a first transmission log timestamp, and a first description of a first content of the first transmission log.

At step S408, transmission log bucketing tool module 302 determines a first set of shard keys by evaluating the first set of transmission logs against the at least one manifest. In an embodiment, shard keys may refer to indexes that identify at least one respectively corresponding transmission log storage partition that stores at least one transmission log.

In embodiments, the evaluation of step S408 may comprise determining that a first transmission log table includes a first set of rows that collectively comprise a first set of respectively corresponding transmission log identification columns that collectively identify the first set of transmission logs and, in additional embodiments, the evaluation of first set of transmission logs may further comprise determining a first set of respectively corresponding shard keys by identifying a first set of respectively corresponding shard key columns that collectively identify the first set of respectively corresponding shard keys. In such embodiments, the first set of rows may further comprise the first set of respectively corresponding shard key columns.

In additional or alternate embodiments, the evaluation of step S408 may comprise determining that the transmission log table does not include a first set of rows that collectively comprise a first set of respectively corresponding transmission log identification columns that collectively identify the first set of transmission logs and, in additional embodiments, the evaluation of step S408 may further comprise generating the first set of respectively corresponding shard keys and updating the transmission log table to include the first set of rows. In such embodiments, the first set of rows may further comprise a first set of respectively corresponding shard key columns that collectively identify the first set of respectively corresponding shard keys.

In yet even further embodiments, transmission log bucketing tool module 302 may generate the first set of respectively corresponding shard keys by performing the following operations: (i) determining a first transmissions account from the first set of transmission logs, wherein the first set of transmission logs comprises at least a first transmission log that identifies the first transmissions account; (ii) determining that at least a first transmission log storage partition of at least a first transmission log storage device is currently assigned to the first transmissions account; (iii) deriving at least a first shard key from an identification of the at least the first transmission log storage partition of the at least the first transmission log storage device; and (iv) populating, with the at least the first shard key, at least a first shard key column from among the first set of respectively corresponding shard key columns. In such embodiments, the first transmissions account may be assigned to the first transmission log storage partition, and the first transmission log storage partition may comprise a first available transmission log storage partition that has been cued up to record a next new transmission log.

At step S410, transmission log bucketing tool module 302 utilizes the first set of shard keys to at least one from among: (a) store the first set of transmission logs within the at least one transmission log storage partition of the at least one transmission log storage device; and (b) retrieve the first set of transmission logs from the at least one transmission log storage partition of the at least one transmission log storage device.

In an embodiment, the utilization function of step S410 may comprise respectively retrieving the first set of transmission logs from a first set of respectively corresponding storage partitions that are identified by the first set of respectively corresponding shard keys. Additionally, or alternatively, the utilization function of step S410 may comprise respectively storing the first set of transmission logs within a first set of respectively corresponding storage partitions that are respectively identified by the first set of respectively corresponding shard keys.

In an embodiment, transmission log bucketing tool module 302 may repeat process 400 after step S410. Thereby, transmission log bucketing tool module 302 may ultimately utilize a plurality of sets of shard keys to store a plurality of sets of transmission logs within a plurality of respectively corresponding transmission log storage partitions.

In such embodiments, each transmission log storage partition may be configured to store no more than a respectively corresponding threshold amount of transmission logs, and the respectively corresponding threshold amount may be an amount of transmission logs above which an unacceptable reduction in a speed of operation is realized by a respectively corresponding transmission log storage device of each respectively corresponding transmission log storage partition.

In these embodiments, the threshold amount may correspond to a maximum number of transmission logs that may be stored within an optimal amount of the respectively corresponding transmission log storage device's memory, and the optimal amount may correspond to the amount of memory above which a speed of a corresponding transmission log storage device begins to fall below a predetermined standard (e.g., 90% of a transmission storage device's maximum speed). However, in additional or alternate embodiments, process 400 may terminate after step S410.

Thereby, the techniques presented herein offer an innovative technological improvement to the storage and retrieval of transmission logs, that optimizes transmission log storage device performance and, thereby, improves transmission log storage device user-experience.

As per the framework presented herein, in order to optimize distributed database system performance through bucketing, it is crucial to select a partition size that enables the storage devices of such partitions to respond quickly because such distributed database partition sizes place less pressure on their corresponding distributed database partition heaps and garbage collectors. Moreover, it is important to select a partition size that not only enables storage devices to respond quickly but also provides a maximum size above which the latency-storage capacity tradeoff becomes unbeneficial.

The herein-presented framework's shard key generation can be a sophisticated computational procedure that is devised to monitor partition sizes when tables are loaded in a database distribution system. Upon reaching a configurable threshold for a partition size, the system may dynamically adjust its bucketing logic to autonomously increment a shard key counter. Subsequently, an event from an incremented shard key counter is communicated to the loader process, and the updated shard key counter is implemented without any intervention dynamically. These operations facilitate dynamic autoscaling of splinter key growth by regularly re-sharding partitions at fixed sizes, thereby, enhancing the operational performance of distributed database systems.

Figure 5:
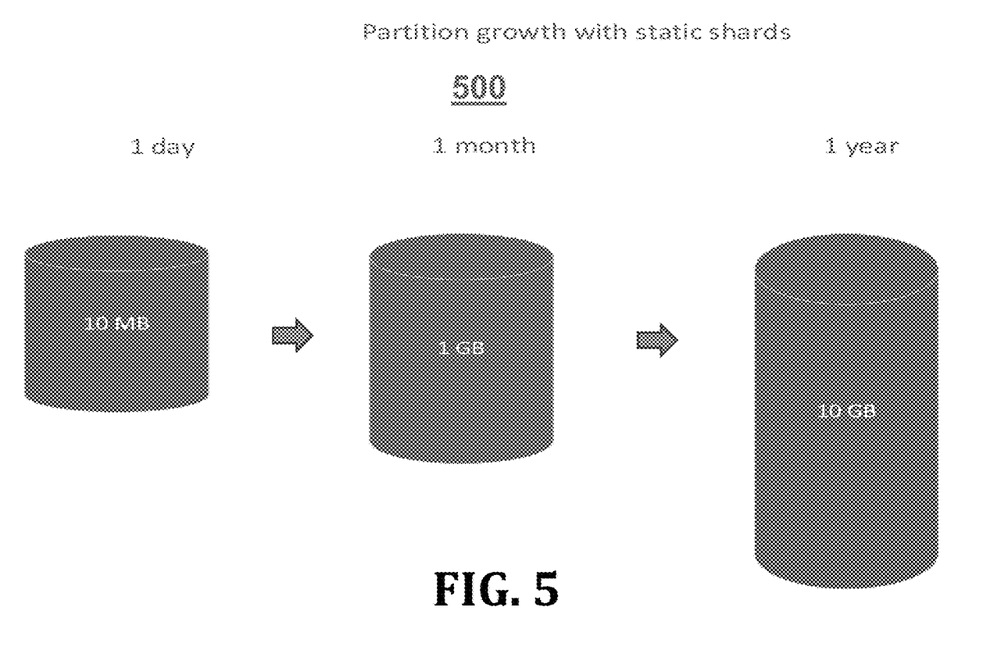
FIG. 5 depicts a growth of a transmission log storage device static shard partition.

For example, FIG. 5 depicts a static growth 500 of a transmission log storage device static shard partition that is assigned to a particular end user's transmissions account. As per a static shard scheme, a single partition is utilized to store every transmission log that is obtained during a particular duration of time and that pertains to the particular end user's transmissions account.

Figure 6:
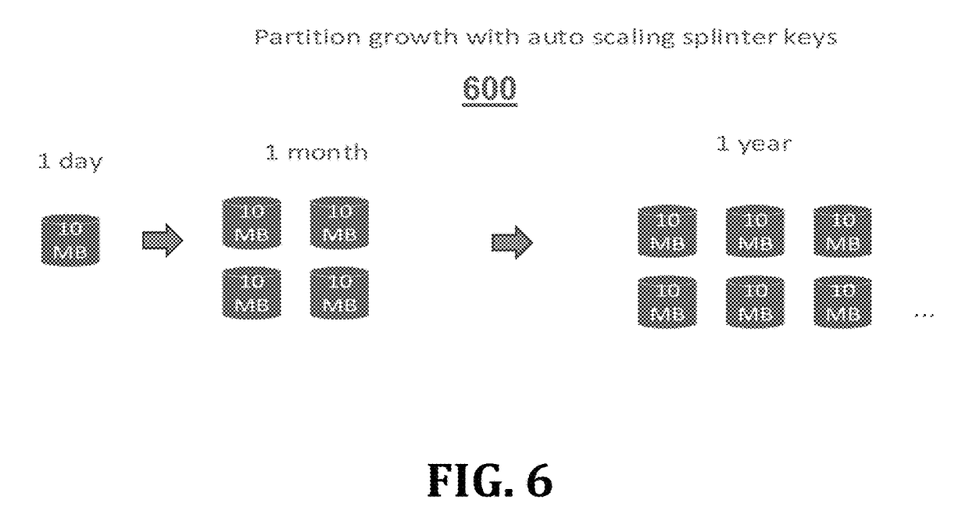
FIG. 6 depicts a bucketed growth of a transmission log storage device system.

Turning to FIG. 6, this figure depicts a bucketed growth 600 of a transmission log storage device system's repository of transmission logs obtained during a particular duration of time and pertaining to an exemplary end user's transmissions account. As per a bucketed shard scheme, optimally-sized transmission log storage partitions are collectively utilized to store this repository of transmission logs according to the scheme depicted by bucket growth 600.

Accordingly, the framework provided herein typically comprises three (3) key components, which include an ingestion component, a reconciliation process, and a consumption layer. The ingestion component may consume files and real-time events that contain data from a source network.

Turning to the reconciliation process, this aspect of the herein-provided framework ensures consistency between data from source networks and an authoritative copy of the data. For database and data quality, checks may be performed to ensure that such databases are complete and ingest data with low latency.

Lastly, the consumption layer of the herein-provided framework allows for on demand and event-based access to data via microservices. In addition, the consumption layer also makes decisions about whether to use local or remote data to respond to user queries.

In an exemplary embodiment, transmission log storage partition sizes may be limited to 100 MB. In an additional (or alternate) embodiment, 10 MB may be utilized as an exemplary optimal amount of memory designated as the transmission log storage partition threshold size for a plurality of transmission log storage devices.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed, rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims, and their equivalents, and shall not be restricted or limited by the foregoing detailed description.

What is claimed is:

1. A method for implementing a transmission log bucketing tool that provides an optimized transmission log storage and retrieval scheme, the method comprising:
   formatting at least one transmission log storage partition of at least one transmission log storage device;
   generating a manifest that comprises a transmission log table;
   obtaining a first set of transmission logs;
   evaluating the first set of transmission logs against the manifest to determine a first set of respectively corresponding shard keys;
   utilizing the first set of respectively corresponding shard keys to at least one from among store the first set of transmission logs and retrieve the first set of transmission logs; and
   utilizing a plurality of sets of shard keys to store a plurality of sets of transmission logs within a plurality of respectively corresponding transmission log storage partitions,
   wherein each transmission log storage partition is configured to store no more than a respectively corresponding threshold amount of transmission logs, and
   wherein the respectively corresponding threshold amount is an amount of transmission logs above which a reduction in a speed of operation is realized by a respectively corresponding transmission log storage device of each respectively corresponding transmission log storage partition.

2. The method of claim 1, wherein the transmission log table comprises a row for each transmission log that is recorded and a set of columns that, for each row, includes:
   a transmission log identification column;
   a transmission log timestamp column; and
   a shard key column that identifies at least one from among a corresponding transmission log storage partition and a corresponding transmission log storage device.

3. The method of claim 1, wherein the first set of transmission logs includes a first transmission log that comprises a first transmission log identification, a first transmission log timestamp, and a first description of a first content of the first transmission log.

4. The method of claim 1, wherein the evaluating comprises:
   determining that the transmission log table includes a first set of rows that collectively comprise a first set of respectively corresponding transmission log identification columns that collectively identify the first set of transmission logs; and
   determining the first set of respectively corresponding shard keys by identifying a first set of respectively corresponding shard key columns that collectively identify the first set of respectively corresponding shard keys,
   wherein the first set of rows further comprise the first set of respectively corresponding shard key columns.

5. The method of claim 1, wherein the utilizing comprises respectively retrieving the first set of transmission logs from a first set of respectively corresponding storage partitions that are identified by the first set of respectively corresponding shard keys.

6. The method of claim 1, wherein the utilizing comprises respectively storing the first set of transmission logs within a first set of respectively corresponding storage partitions that are respectively identified by the first set of respectively corresponding shard keys.

7. The method of claim 1, wherein the evaluating comprises:
   determining that the transmission log table does not include a first set of rows that collectively comprise a first set of respectively corresponding transmission log identification columns that collectively identify the first set of transmission logs;
   generating the first set of respectively corresponding shard keys; and
   updating the transmission log table to include the first set of rows,
   wherein the first set of rows further comprise a first set of respectively corresponding shard key columns that collectively identify the first set of respectively corresponding shard keys.

8. The method of claim 7, wherein the generating comprises:
   determining a first transmissions account from the first set of transmission logs, wherein the first set of transmission logs comprises at least a first transmission log that identifies the first transmissions account;
   determining that at least a first transmission log storage partition of at least a first transmission log storage device is currently assigned to the first transmissions account;
   deriving at least a first shard key from an identification of the at least the first transmission log storage partition of the at least the first transmission log storage device; and
   populating, with the at least the first shard key, at least a first shard key column from among the first set of respectively corresponding shard key columns.

9. The method of claim 8, wherein the first transmissions account is assigned to the first transmission log storage partition and the first transmission log storage partition comprises a first available transmission log storage partition that has been cued up to record a next new transmission log.

10. A system for implementing a transmission log bucketing tool that provides an optimized transmission log storage and retrieval scheme, the system comprising:
    a processor; and memory storing instructions that, when executed by the processor, cause the processor to perform operations comprising:
formatting at least one transmission log storage partition of at least one transmission log storage device;
generating a manifest that comprises a transmission log table;
obtaining a first set of transmission logs;
evaluating the first set of transmission logs against the manifest to determine a first set of respectively corresponding shard keys;
utilizing the first set of respectively corresponding shard keys to at least one from among store the first set of transmission logs and retrieve the first set of transmission logs; and
utilizing a plurality of sets of shard keys to store a plurality of sets of transmission logs within a plurality of respectively corresponding transmission log storage partitions,
wherein each transmission log storage partition is configured to store no more than a respectively corresponding threshold amount of transmission logs, and
wherein the respectively corresponding threshold amount is an amount of transmission logs above which a reduction in a speed of operation is realized by a respectively corresponding transmission log storage device of each respectively corresponding transmission log storage partition.

11. The system of claim 10, wherein when the instructions are executed, the transmission log table comprises a row for each transmission log that is recorded and a set of columns that, for each row, includes:
a transmission log identification column;
a transmission log timestamp column; and
a shard key column that identifies at least one from among a corresponding transmission log storage partition and a corresponding transmission log storage device.

12. The system of claim 10, wherein when the instructions are executed, the first set of transmission logs includes a first transmission log that comprises a first transmission log identification, a first transmission log timestamp, and a first description of a first content of the first transmission log.

13. The system of claim 10, wherein when the instructions are executed, the evaluating comprises:
determining that the transmission log table includes a first set of rows that collectively comprise a first set of respectively corresponding transmission log identification columns that collectively identify the first set of transmission logs; and
determining the first set of respectively corresponding shard keys by identifying a first set of respectively corresponding shard key columns that collectively identify the first set of respectively corresponding shard keys,
wherein the first set of rows further comprise the first set of respectively corresponding shard key columns.

14. The system of claim 10, wherein when the instructions are executed, the utilizing comprises respectively retrieving the first set of transmission logs from a first set of respectively corresponding storage partitions that are identified by the first set of respectively corresponding shard keys.

15. A non-transitory computer-readable medium for implementing a transmission log bucketing tool that provides an optimized transmission log storage and retrieval scheme, the computer-readable medium comprising instructions that, when executed by a processor, cause the processor to perform operations comprising:
formatting at least one transmission log storage partition of at least one transmission log storage device;
generating a manifest that comprises a transmission log table;
obtaining a first set of transmission logs;
evaluating the first set of transmission logs against the manifest to determine a first set of respectively corresponding shard keys;
utilizing the first set of respectively corresponding shard keys to at least one from among store the first set of transmission logs and retrieve the first set of transmission logs; and
utilizing a plurality of sets of shard keys to store a plurality of sets of transmission logs within a plurality of respectively corresponding transmission log storage partitions,
wherein each transmission log storage partition is configured to store no more than a respectively corresponding threshold amount of transmission logs, and
wherein the respectively corresponding threshold amount is an amount of transmission logs above which a reduction in a speed of operation is realized by a respectively corresponding transmission log storage device of each respectively corresponding transmission log storage partition.

16. The computer-readable medium of claim 15, wherein when the instructions are executed, the evaluating comprises:
determining that the transmission log table does not include a first set of rows that collectively comprise a first set of respectively corresponding transmission log identification columns that collectively identify the first set of transmission logs;
generating the first set of respectively corresponding shard keys; and
updating the transmission log table to include the first set of rows,
wherein the first set of rows further comprise a first set of respectively corresponding shard key columns that collectively identify the first set of respectively corresponding shard keys.

17. The computer-readable medium of claim 16, wherein when the instructions are executed, the generating comprises:
determining a first transmissions account from the first set of transmission logs, wherein the first set of transmission logs comprises at least a first transmission log that identifies the first transmissions account;
determining that at least a first transmission log storage partition of at least a first transmission log storage device is currently assigned to the first transmissions account;
deriving at least a first shard key from an identification of the at least the first transmission log storage partition of the at least the first transmission log storage device; and
populating, with the at least the first shard key, at least a first shard key column from among the first set of respectively corresponding shard key columns.

18. The computer-readable medium of claim 17, wherein when the instructions are executed, the first transmissions account is assigned to the first transmission log storage partition and the first transmission log storage partition comprises a first available transmission log storage partition that has been cued up to record a next new transmission log.

19. The method of claim 1, wherein the reduction in the speed of operation comprises at least a ten percent reduction from a maximum speed of the respectively corresponding transmission log storage device of the respectively corresponding transmission log storage partition.

20. The system of claim 10, wherein the reduction in the speed of operation comprises at least a ten percent reduction from a maximum speed of the respectively corresponding transmission log storage device of the respectively corresponding transmission log storage partition.

* * * * *